United States Patent
Calvani et al.

(12) 
(10) Patent No.: US 6,661,549 B1
(45) Date of Patent: Dec. 9, 2003

(54) METHOD OF AND A DEVICE FOR POLARIZATION-INDEPENDENT OPTICAL DEMULTIPLEXING

(75) Inventors: Riccardo Calvani, Pino Torinese (IT); Francesco Cisternino, Turin (IT); Raffaele Girardi, Mondovi (IT); Emilio Riccardi, Turin (IT)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/443,083

(22) Filed: Nov. 18, 1999

(30) Foreign Application Priority Data

Dec. 10, 1998 (IT) ............................. TO98A1032

(51) Int. Cl.⁷ .............................................. H04J 14/08
(52) U.S. Cl. ....................... 359/135; 359/122; 359/123; 359/124; 359/127; 359/156; 359/161; 359/171
(58) Field of Search ................................. 359/122, 135, 359/124, 156, 127, 161, 171, 123

(56) References Cited

U.S. PATENT DOCUMENTS

| | | | |
|---|---|---|---|
| 5,400,164 A | * | 3/1995 | Kurtzke et al. ............. 359/156 |
| 6,023,360 A | | 2/2000 | Morioka et al. ............ 359/123 |
| 6,229,937 B1 | * | 5/2001 | Nolan et al. .................. 385/11 |
| 6,266,179 B1 | * | 7/2001 | Nakamoto .................. 359/326 |

FOREIGN PATENT DOCUMENTS

JP    HEI8(96)-100534    4/1996

* cited by examiner

*Primary Examiner*—Jason Chan
*Assistant Examiner*—Dzung Tran

(57) ABSTRACT

This invention concerns a method of and a device for optical demultiplexing that are based on the four wave mixing between the signals to be demultiplexed and pump signals. The two signals are fed into a polarization maintaining fiber (14), which divides them into two components with orthogonal polarization, separated in time; and the four wave mixing is performed separately on the two components, thereby originating two separate signals that are polarization-rotated and re-combined. (FIG. 1).

8 Claims, 2 Drawing Sheets

METHOD OF AND A DEVICE FOR POLARIZATION-INDEPENDENT OPTICAL DEMULTIPLEXING

FIELD OF THE INVENTION

This invention relates to optical time division communication systems and concerns in particular a method of and a device for polarization-independent optical demultiplexing of the signals transmitted in such a system, for instance, a system in which the signals are transmitted by using the Optical Time Division Multiplexing (OTD) technique.

BACKGROUND OF THE INVENTION

In an OTD system, the optical pulses corresponding to the different tributary channels are interleaved into a single stream, in different time positions. In this way very high bit rate transmissions (even in the order on hundreds of Gbits/s) are obtained without the need for using particularly sophisticated opto-electronic components for the transmission and reception of the individual tributaries. At such bit rates, demultiplexing must be effected in a fully optical way and one of the commonly used techniques for this purpose is the so-called four wave mixing. The phenomenon of four wave mixing is a non-linear phenomenon wherein an information signal at a frequency $f_s$ of sufficiently high power, is made to interact with a pair of pump or control signals, having respective frequencies $f_{p1}$, $f_{p2}$ different from $f_s$ and also having sufficiently high power, and a mixing signal at a frequency $f_{p1}, +f_{p2}-f_s$ is generated.

Very often use is made of only one control signal at a frequency $f_p$, thus obtaining a mixing signal at a frequency $2f_p-f_s$ (partially degenerate four wave mixing).

For the optical demultiplexing of an OTD stream through four wave mixing, the multiplexed stream and control pulses, which have the same repetition frequency as the tributaries and are time-aligned with the pulses of the channel to be extracted, are fed into a non-linear optical medium, and at the output a filtering is effected to maintain the mixing signal only. An example of this technique is described in the paper "16 Gbit/s all optical demultiplexing using four wave mixing" by P. A. Andrekson et al., Electronics Letters, Vo. 27, No 11, May 23, 1991, pp. 922 to 924.

This demultiplexing technique is particularly simple, since it does not use interferometric structures, and it is efficient also at very high bit rates; nevertheless its efficiency is strongly dependent on the state of polarization of both the information signal and the control signals. Now, considering that the optical fiber transmission lines commonly used in telecommunications are not made up of polarization maintaining fibers, the need arises of ensuring in the demultiplexer the correct relation between the state of polarization of both the control signals and the signals to be demultiplexed.

Solutions based on polarization diversity schemes meeting this requirement have been already proposed in the literature.

The paper "Polarization-independent 100 Gbit/s all optical demultiplexing using four-wave mixing in a polarization maintaining fibre loop" by T.Morioka et al., Electronics Letters, Vol. 30, No. 7, Mar. 31, 1994, pp 591–592, discloses effecting the four wave mixing in a loop consisting of a dispersion shifted and polarization maintaining fiber, in which the two outputs with orthogonal polarizations of a polarizing beam splitter are aligned with a same eigenaxis of the polarization maintaining fibre. Since the mixing efficiency per length unit is very low in dispersion shifted and polarization-maintaining fibers, it is necessary to use a rather long fiber section (of the order of some kilometers). The dispersion shifted and polarization maintaining fibers are rather expensive and this makes using such devices within the network particularly costly, considering that a demultiplexer for each channel is needed.

A second known solution is described in the article "Polarization-independent alloptical demultiplexing up to 200 Gbit/s using four-wave mixing in a semiconductor laser amplifier" by T.Morioka et al, Electronics Letters, Vol. 32, No 9, Apr. 25, 1996, pp 840 to 842. The article describes a demultiplexing method wherein the four wave mixing is performed in an optical semiconductor amplifier, connected between two identical sections of a polarization maintaining fiber, so arranged that the birefringence axes of one of the sections are rotated by 90° with respect to those of the other. In this way the depolarization effect of the first fiber—which results in a time separation of the pulses propagating along the fast axis and the slow axis—is compensated by the second fiber. However, the compensation takes actually place only if the two fiber sections have exactly the same length and are perfectly oriented. Both conditions are rather difficult to achieve in practice, in particular at the time of the industrial production of a component.

According to this invention, a method and a device are instead provided that are self-aligning and therefore do not require any critical mounting operations or use of long sections of special and expensive fiber.

In particular, the invention concerns a method wherein the signals of the stream to be demultiplexed and the control signals are fed into a section of polarization maintaining fiber that separates said signals into two components with orthogonal polarization and separated in time, and the four wave mixing is effected separately on said two components, thereby originating two individual mixing signals. According to the invention two components are fed into a dispersion shifted fiber section, in which said separate mixing takes place, and the individual mixing signals are subjected to a reflection with a 900 rotation of the state of polarization and are sent towards a receiver, passing again through the dispersion shifted fiber section and the polarization maintaining fiber section, where joining between said mixing signals occurs.

The invention also concerns the device for implementing the method. Said device comprises: means for bringing the stream to be demultiplexed and control signals, that occur at a rate equal to the rate of the pulses of a tributary channel and are time-aligned with the pulses of a channel to be extracted from the stream, to such a power level as to allow originating non-linearity phenomena; means, including a polarization maintaining fiber section, for splitting the optical signals of said stream and the control signals into two time-separated components with orthogonal state of polarization; means for effecting a four wave mixing between the signals relating to the channel to be extracted and the control signals, separately for said two components; filtering means for separating the mixing signals relating to the two components; and means for combining into a single signal the mixing signals relating to the two components.

According to the invention, the mixing means comprise a dispersion-shifted fiber section that is connected to the polarization maintaining fibre section, conveys the mixing signals relating to the two polarization components towards means arranged to reflect such mixing signals and to rotate their polarization by 90°, and collects and sends the reflected signals into the same polarization maintaining fiber section that had caused the separation between the components, so that such section constitutes also the means of combining into a single signal the mixing signals relating to the two components.

BRIEF DESCRIPTION OF THE DRAWING

For further clarification, reference is made to the accompanying drawing, wherein.

SPECIFIC DESCRIPTION

Figure 1:
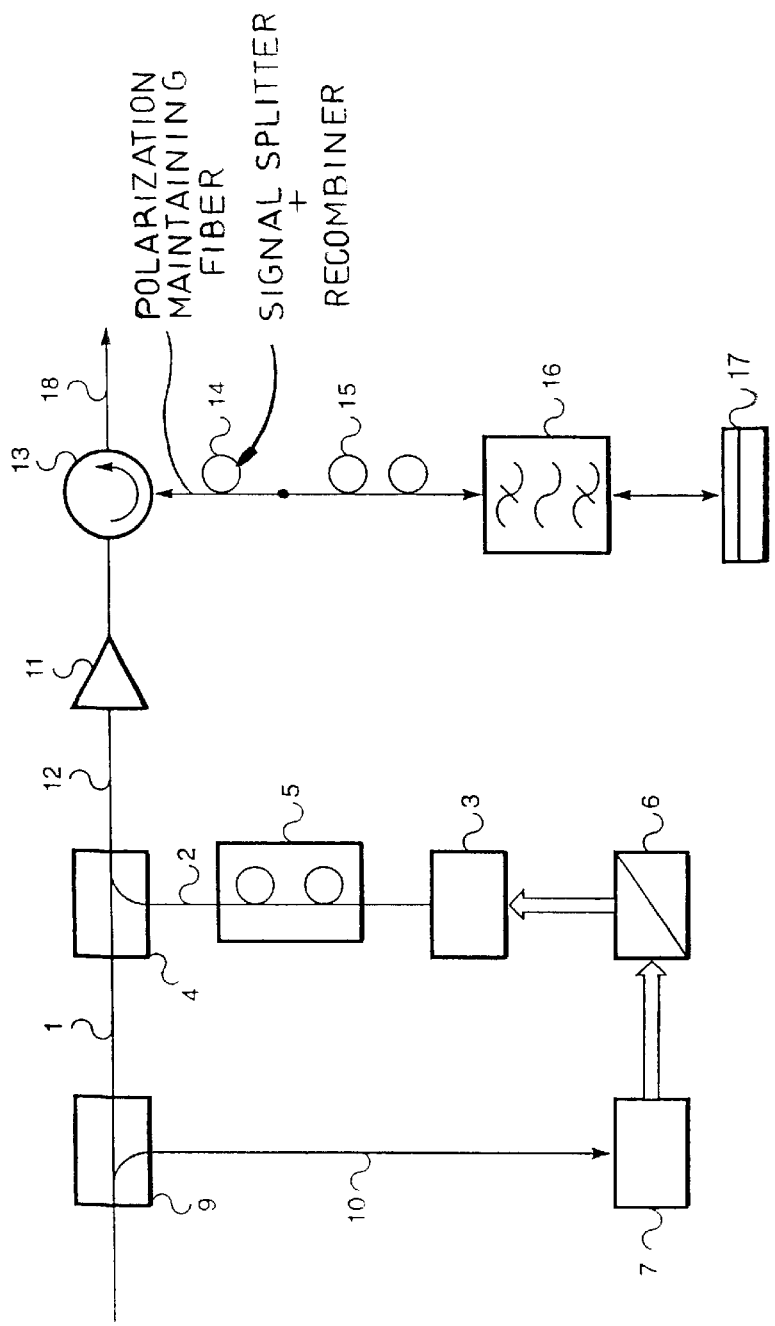
FIG. 1 is a diagram of the device, according to the invention.

In the drawings, double line arrows show the path of electric signals and single line arrows the path of the optical signals.

As depicted in FIG. 1, a first optical fiber 1 which conveys the time-division multiplexed stream to be demultiplexed and a second fiber 2 which carries the pulses of a control signal generated by a source 3 are connected to an optical coupler 4. A polarization control device 5 is connected between the source 3 of the control signal and the coupler 4 to ensure a desired state of polarization for the control signal pulses, for the reasons that will be better explained hereinafter. The pulses of the control signal are aligned in time with the pulses of the tributary channel to be extracted, through a variable delay line 6 driven by a device 7 for the recovery of the clock at the frequency of the tributaries.

Devices for the clock recovery in OTD transmission are known in the art. An example that may be used in this invention is described in the paper "A novel approach to pre-scaled clock recovery in OTDM systems" presented by F. Cisternino et alii at the conference ECOC' 98, Madrid (Spain) Sep. $20^{th}$ to $24^{th}$ 1998, and published on pages 477–478 of Vol. I of the conference proceedings. This device extracts the clock signal starting from a fraction of the power of the optical signals present on fiber 1, which fraction is taken through a beam splitter 9 inserted along the transmission line 1 and is sent to the device 7 through a fiber length 10.

The coupler 4 is followed by a high power optical amplifier 11 that brings the pulses present on output 12 of the coupler to a sufficiently high power for the nonlinear interaction between the signal to be demultiplexed and the control pulses can take place.

The output of amplifier 11 is in turn connected to an input port of an optical circulator 13 that has an input/output port connected to a short section of polarization maintaining optical fiber 14. At the input of the polarization maintaining fibre 14, the pulses of the control signal must have a state of polarization such as to allow splitting each pulse of the control signal into two orthogonal polarization components of a same amplitude. This state, which in the exemplary embodiment shown in FIG. 1 is set by the device 5, may be a linear state, oriented at 45° with respect to the orthogonal reference defined by the birefringence axes of the polarization maintaining fiber or an elliptical state, with its major axis oriented at 45° with respect to said reference.

The polarization maintaining fiber 14 splits the pulses of the information signal and of the control signal into the two orthogonal polarization components, that will be time separated at the end of the propagation along such fiber. Fiber 14 is connected in turn to a dispersion-shifted fiber section 15 in which the four wave mixing between the pulses of same polarization takes place.

The section 14 of the polarization maintaining fiber depends on its birefringence and the width of the control and information signal pulses, thus on the transmission rate. A length of few tens of meters is sufficient to guarantee a sufficient time separation between the two modes also for fibers not exhibiting a particularly high birefringence.

As far as the dispersion shifted fiber 15 is concerned, a length of a couple of kilometers is sufficient to achieve a good mixing efficiency in the case in which use is made of standard fibers for telecommunications. As is known, there are however high non-linearity fibers that allow obtaining a good mixing efficiency with much shorter lengths. Use of such fibers allows a considerable reduction in the device size.

Assuming that the partially degenerate four wave mixing is used, by way of a non-limiting example reference will be made to a wavelength of 1544 nm for the information signal to be demultiplexed and to a wavelength of 1548 nm for the control pulses. The four wave mixing will originate a pulse at a wavelength of 1552 nm. The dispersion-shifted fiber may have a zero dispersion wavelength at 1545 nn. Thus the mixing signal is located in the anomalous dispersion region of the fiber. Since both the signal to be demultiplexed and the control signals have been split into two orthogonal polarization components, time separated within the polarization maintaining fiber 14, the four wave mixing along the dispersion shifted fiber 15 will originate a pair of pulses separated by a time equal to the group delay of the two components.

Fiber 15 ends at an optical pass-band filter 16 with a passband centered on the wavelength of the pulses generated by the four wave mixing, thus 1552 nm in the example given.

The two (slow and fast) pulses outgoing from filter 16 are led to a Faraday mirror 17 which rotates by 90° their polarization and reflects them, sending them towards the circulator 13 through filter 16. The 90° rotation of the state of polarization caused by the Faraday mirror 17 causes the mutual exchange between the fast mode and the slow mode, so that the second passage along fiber 14 subjects the two pulses to a delay complementary to the one they had experienced in the propagation from the circulator towards the mirror. When re-entering the circulator, the pulses corresponding to the two polarization modes are thus re-combined into a single pulse. This pulse goes out through the second output port of circulator 13 and is sent through a fiber 18 towards the system receiver, not shown.

The double passage through filter 16 allows a very efficient suppression of the spectral components corresponding to the control signal and to the information signal by means of only one device. Yet this double passage involves a higher attenuation of the extracted signal, that may be partially compensated by exploiting the parametric amplification due to the linear interaction, if the spectrum of the extracted signal is located in the anomalous dispersion region of fiber 15, as in the case of the wavelengths chosen in the example given herein. In any case, the receiver may comprise further optical amplification stages, whenever required.

By virtue of the use of the Faraday mirror 17 which reflects the two mixing pulses into the same fiber that had separated the two polarization components, the problems of alignment between the axes of the two sections used in second article by T. Morioka et alii, cited above, are avoided, so that the device does not involve mounting problems for the practical production. Furthermore, the separation between the polarization components occurs in a fiber section different from the one that must perform the four wave mixing, and therefore the cost problems are eliminated that arise due to the use of a long polarization maintaining and dispersion shifted fiber, as in the case of the other known device. In this respect, it must further be noted that the fiber with only the polarization maintaining feature (i.e. not dispersion shifted) is in any case less expensive than a fibre having both features.

The device shown herein serves for the extraction of a channel and therefore must be provided in a number equal to the number of channels, if the simultaneous extraction of all the tributaries is required. Alternatively, if fiber 15 allows so, it is also possible to use more control signals, of different wavelengths, each synchronized with one of the tributaries.

It is evident that what is described is given by way of a non limiting example and that variations and modifications are possible without thereby departing from the scope of the present invention.

For example, a strongly asymmetric beam splitter (for instance providing on an output 99% of the input power and on the other output 1% of said power) may be provided along the fiber 15, in order to send a small power fraction towards a monitoring device that, in a calibration phase of the device, in the absence of the information signal, allows checking the correctness of the state of polarization of the control signals: the correctness is guaranteed when the amplitudes of the orthogonal components of a control pulse are equal.

Figure 2:
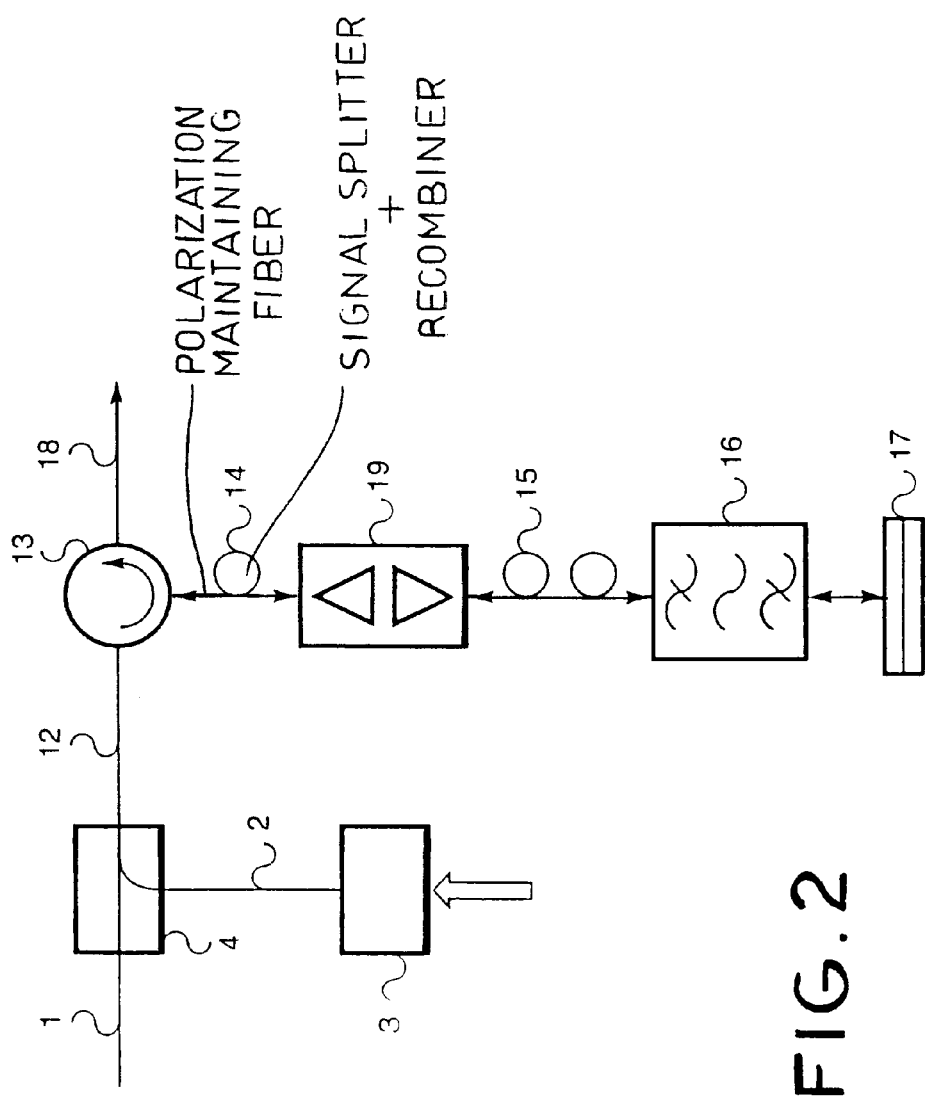
FIG. 2 is the diagram of a variant embodiment.

Further, as can be seen in FIG. 2, it is possible to eliminate the polarization control device 5, that applies to the control signals a pre-defined state of polarization, if the path between the source 3 and the polarization maintaining fiber 14 is implemented with polarization maintaining components.

In such a case the state of polarization required for the operation (the linear state by 45° or the elliptical state with major axis at 45°), is obtained through an appropriate alignment of the polarization of the source 3 and an adequate orientation of the fiber 14. Also the pigtails connecting circulator 13 to the fibers 12, 14 and those connecting the coupler to fibers 2, 12 will have to be made of polarization maintaining fibers; the pigtails associated to the coupler may however also be of a standard fiber, provided they are very short.

In the diagram of FIG. 2 it has also been assumed that the amplification of the information and control signals that is required to obtain the power levels necessary for the non-linear interaction, is obtained through a single bi-directional amplifier 19, connected between the two fibers 14 and 15.

We claim:

1. A method of optically demultiplexing a stream of optical information signals belonging to a plurality of time division multiplexed tributary channels, comprising the steps of:

extraction signals relating to a given channel by exploiting the four wave mixing between the signals of said channel and control signals that repeat at a rate identical to the repetition rate of the signals of the channel and are time-aligned therewith;

propagating signals of a signal stream to be demultiplexed and the control signals along a section of a polarization maintaining fiber that splits said signals into two orthogonal polarization components which are time separated, the four wave mixing being performed separately on said two components, thereby originating two individual mixing signals;

feeding said two components into a section of a dispersion shifted fiber in which the separate mixing takes place; and subjecting the individual mixing signals to a reflection that causes a 90° rotation of their state of polarization and are sent towards a receiver by flowing again through the dispersion shifted fiber section and the polarization maintaining fiber section, that makes them join again, the pulses of the control signals having a linear state of polarization that is oriented at 45° to an orthogonal reference defined by a birefringence axis of the polarization maintaining fiber or an elliptical state with its major axis oriented at 45° with respect to said reference.

2. The method according to claim 1 wherein said control signals are caused to arrive at said polarization maintaining fiber section with such a state of polarization that the two components have the same amplitude.

3. The method according to claim 1 wherein said dispersion shifted fiber section has such a zero dispersion wavelength that the mixing signals have a wavelength comprised in an anomalous dispersion region of the same fiber.

4. The device for the optical demultiplexing of a stream of optical information signals, belonging to a plurality of optical time division multiplexed tributary channels, the device comprising: means for bringing the signals of the stream to be demultiplexed and control signals, that occur at a rate equal to the rate of a tributary channel and are time-aligned with the signals of a channel to be extracted from the stream, to such a power level as to allow originating nonlinearity phenomena; means, comprising a polarization maintaining fiber, for splitting both the signals of the channel to be extracted and the control signals into two components with orthogonal state of polarization and time separated; mixing means for effecting a four wave mixing between the signals of a channel to be extracted and the control signals, so as to generate separate mixing signals for said two components; filtering means for isolating the mixing signals relating to the two components; and means for recombining into a single signal the mixing signals relating to the two components, the mixing means comprising a dispersion shifted fiber section that is connected in series to the polarization maintaining fiber section, conveys the mixing signals relating to the two polarization components towards reflection and rotating means arranged to reflect such mixing signals and to rotate their polarization by 90°, and collects and sends the reflected signals into the same polarization maintaining fiber that had originated the splitting among the components, so that said polarization maintaining fiber constitutes also the means for recombining the mixing signals into a single signal, the pulses of the control signals having a linear state of polarization that is oriented at 45° to an orthogonal reference defined by a birefringence axis of the polarization maintaining fiber or an elliptical state with its major axis oriented at 45° with respect to said reference.

5. The device according to claim 4 which comprises means for making said control signals reach said polarization maintaining fiber section with such a state of polarization that said two components have a same amplitude.

6. The device according to claim 5 wherein the reflecting and rotating means for reflection and polarization rotation comprises a Faraday mirror.

7. The device according claim 5 wherein said dispersion shifted fiber has a zero-dispersion wavelength such that the mixing signals have a wavelength comprised in an anomalous dispersion region of the same fiber.

8. The device according to claim 5 wherein the amplification means include a bi-directional optical amplifier arranged between the polarization maintaining fiber and the dispersion shifted fiber.

* * * * *